3,040,097
BETA-HYDROXY ALKYL ETHERS OF OXIMES
AND PRODUCTION THEREOF
Gustave B. Bachman, Lafayette, Ind., and Takeo Hokama, Pittsburgh, Pa., assignors to Purdue Research Foundation, Lafayette, Ind., a corporation of Indiana
No Drawing. Filed Apr. 6, 1959, Ser. No. 804,069
12 Claims. (Cl. 260—566)

Our invention relates to new beta-hydroxy alkyl ethers of oximes and to a method of producing same. More particularly, it relates to new beta-hydroxy alkyl ethers of oximes having the structural formula:

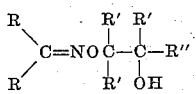

wherein R' is hydrogen, R" is selected from the group consisting of hydrogen, lower alkyl and phenyl, and R is hydrogen, lower alkyl or aryl.

In carrying out our new process, we can use either a ketoxime such as acetoxime, butanone oxime, acetophenone oxime, benzophenone oxime and the like, or an aldoxime such as, for example, butyraldoxime, benzaldoxime and the like. We have found that any oxime is operative.

Any olefin oxide can be used in our process for the production of beta-hydroxy alkyl ethers of oximes, as for example, ethylene oxide, propylene oxide, styrene oxide and the like.

Optimum results are obtained by contacting under suitable temperature conditions approximately equimolar proportions of the oxime and olefin oxide. Generally, lower yields of the desired compounds are obtained when an excess of either reactant is used.

The reaction can be carried out under a wide range of temperatures ranging from 0 to 100° C. We have generally found it preferable, however, to operate within the range of 50–80° C. In general, the speed of the reaction is accelerated as the temperature is raised but it is undesirable to use temperatures substantially above the ranges set forth above because of the possibility of undesired side reactions taking place. The preferred operating temperature is also varied somewhat with the particular combination of reactants being used.

The order of mixing the reactants is not critical. In general, however, it is found more desirable to add the olefin oxide to the oxime being reacted.

The reaction can, if desired, or necessary, be carried out in the presence of a solvent which is inert both to the reactants and the products being formed. Aliphatic alcohols such as ethanol, propanol, butanol, have been found to be satisfactory. Where the oxime being reacted is a liquid and the reaction which takes place upon the addition of the olefin oxide thereto is not too vigorous, the use of an inert solvent is generally not necessary.

Our new reaction is effected in the presence of any basic material which does not react with the olefin oxide being used and which in aqueous solution gives a greater pH than approximately 7.0. Examples of suitable basic materials which we have found to be particularly suitable include sodium hydroxide, sodium ethoxide, lithium ethoxide and the like.

The operation of our new process for the production of beta-hydroxy alkyl ethers of oximes is illustrated by the following examples. It is understood, however, that we are not limited to the particular reactants or reaction conditions shown therein and that obvious variations of the procedures set forth therein are within the scope of our invention.

EXAMPLE I

Ethylene oxide, 25 g. (0.58 mole), was added during a two hour period to a solution of acetoxime, 40 g. (0.55 mole) and sodium hydroxide (0.25 mole) in water (100 ml.) at 50° C. and the mixture was stirred for an additional hour. At the end of this time, the cooled solution was neutralized with hydrochloric acid and continuously extracted with ether for a period of three days. The ether solution was dried and distilled. 2-hydroxyethyl ether of acetoxime, B.P. 54° C. (4 mm.), $n_D^{20}$ 1.4488, 20 g. (31% theory), was isolated.

EXAMPLE II

Ethylene oxide, 22 g. (0.5 mole), was added during a two hour period to a solution of butanone oxime, 43.4 g. (0.5 mole), and sodium ethoxide (0.1 mole) in ethanol (100 ml.) at 50° C., and the mixture was stirred for an additional hour. The resulting mixture was worked up according to the procedure described in Example I above. 2-hydroxyethyl ether of butanone oxime, B.P. 61° C. (4 mm.), $n_D^{20}$ 1.4498, 20 g. (40% theory), was isolated.

EXAMPLE III

Ethylene oxide, 22 g. (0.5 mole), was introduced through a gas inlet tube during a period of 1¼ hours to a solution of acetophenone oxime, 41 g. (0.3 mole), and lithium ethoxide (0.1 mole) in ethanol (200 ml.) at 50–60° C., and the reaction mixture was stirred for an additional 45 minutes. The resulting cooled solution was acidified with acetic acid, and concentrated under water aspiration. The residue was taken up in a mixture of ether (200 ml.) and water (100 ml.), and the ether layer was separated. The aqueous solution was extracted twice with ether (25 ml. portions), and the combined ether solutions were washed with water, dried and distilled. 2-hydroxyethyl ether of acetophenone oxime, B.P. 114° C. (1 mm.), $n_D^{20}$ 1.5545, 30.5 g. (57% theory), was isolated.

EXAMPLE IV

Ethylene oxide, 13 g. (0.29 mole) was added during a period of one hour to a solution of benzophenone oxime, 37 g. (0.188 mole), and lithium ethoxide (0.1 mole) in ethanol (200 ml.) at 50–60° C. and the resulting reaction mixture was stirred for an additional hour. The reaction mixture was worked up in accordance with the procedure described in Example III. 2-hydroxyethyl ether of benzophenone oxime, B.P. 160° C. (1 mm.), $n_D^{20}$ 1.6036, 35.5 g. (82% theory), was isolated.

EXAMPLE V

Propylene oxide, 20 g. (0.35 mole), was added during a period of one hour to a solution of acetoxime, 21 g. (0.3 mole), and lithium ethoxide (0.1 mole) in ethanol at 55° C. and the resulting mixture was stirred for an additional period of three hours. The cooled solution was acidified with acetic acid, 6 g. (0.1 mole), and the mixture was fractionated at reduced pressure. 2-hydroxy-1-propyl ether of acetoxime, B.P. 47° C. (1 mm.), $n_D^{20}$ 1.4424, 20 g. (51% theory), was isolated.

EXAMPLE VI

Propylene oxide, 28 g. (0.5 mole), was added during a three hour period to a solution of butanone oxime, 43 g. (0.5 mole), and sodium ethoxide (0.1 mole) in ethanol (200 ml.) at 50° C., and the resulting reaction mixture was heated to reflux for an additional period of two hours. The reaction mixture was worked up according to the procedure described in Example V. 2-hydroxy-1-propyl ether of butanone oxime, B.P. 62° C. (2 mm.), $n_D^{20}$ 1.4446, 35 g. (48% theory), was isolated.

EXAMPLE VII

Propylene oxide, 28 g. (0.5 mole), was added during a period of 45 minutes to a solution of butyraldehyde oxime, 43 g. (0.5 mole), and lithium ethoxide (0.1 mole) in ethanol (200 ml.) at 50° C. and the resulting reaction mixture was stirred for an additional three hours and 15 minutes. The reaction mixture was worked up according to the procedure described in Example V. 2-hydroxy-1-propyl ether of butyraldehyde oxime, B.P. 53° C. (1 mm.), $n_D^{20}$ 1.4426, 20 g. (28% theory), was isolated.

EXAMPLE VIII

Ethylene oxide, 22 g. (0.5 mole), was added during the period of 45 minutes to a solution of acetaldehyde oxime, 30 g. (0.5 mole), and lithium ethoxide (0.1 mole) in ethanol (200 milliliters) at 50° C. and the resultant reaction mixture was stirred for an additional three hours. The reaction mixture was worked up as described in Example V. 2-hydroxy-1-ethyl ether of acetaldehyde oxime, B.P. 38° C. (2 mm.), $n_D^{20}$ 1.4416, 27.8 g. (27% theory), was isolated.

Table I below summarizes additional experiments carried out under the same general conditions as described in Examples I–VIII above, together with the properties of the resulting beta-hydroxy alkyl ethers of oximes formed.

*Table I*

| Epoxide | Oxime | Base | Time, hrs. | Temp., °C. | Product | Yield, percent | B.P. | $n_D^{20}$ |
|---|---|---|---|---|---|---|---|---|
| Propylene oxide | Acetophenone | Lithium ethoxide | 6 | 50–60 | 2-hydroxy-1-propyl ether of acetophenone oxime. | 58 | 112 (1 mm.) | 1.5412 |
| Do | Benzophenone | do | 6 | 55–60 | 2-hydroxy-1-propyl ether of benzophenone oxime. | 70 | 154 (1 mm.) | 1.5866 |
| Styrene oxide | Acetone | Sodium ethoxide | 6 | 80 | 2-hydroxy-2-phenyl ethyl ether of acetoxime. | 60 | 121–125 (1 mm.) | 1.5262 |
| Do | Butanone | Lithium ethoxide | 6 | 80 | 2-hydroxy-2-phenyl ethyl ether of butanone oxime. | 63 | 132 (1 mm.) | 1.5206 |
| Do | Acetophenone | do | 6 | 80 | 2-hydroxy-2-phenyl ethyl ether of acetophenone oxime. | 63 | 175 (1 mm.) | 1.5873 |
| Do | Benzophenone | do | 8 | 80 | 2-hydroxy-2-phenyl ethyl ether of benzophenone oxime. | 72 | 210–217 (1 mm.) |  |

Our new beta-hydroxy alkyl ethers of oximes are useful as starting materials for the production of surface active agents. Our new oxime ethers can, for example, be catalytically reduced to the corresponding N-alkyl hydroxylamine ether which is then alkylated with a higher alkyl halide or sulfate, such as lauryl chloride to obtain a surface active agent such as N-ethyl-N-laurylhydroxylamine ether.

Now having described our invention, what we claim is:

1. The compounds represented by the formula:

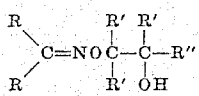

wherein R′ is hydrogen, R″ is selected from the group consisting of hydrogen, lower alkyl and phenyl, and R is selected from the group consisting of hydrogen, lower alkyl phenyl and benzyl.
2. 2-hydroxyethyl ether of acetoxime.
3. 2-hydroxyethyl ether of butanone oxime.
4. 2-hydroxyethyl ether of acetophenone oxime.
5. 2-hydroxyethyl ether of benzophenone oxime.
6. 2-hydroxyl-propyl ether of acetoxime.
7. In a process for the production of beta-hydroxy alkyl ethers of oximes having the structural formula:

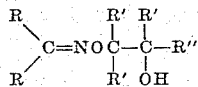

wherein R′ is hydrogen, R″ is selected from the group consisting of hydrogen, lower alkyl and phenyl, and R is selected from the group consisting of hydrogen, lower alkyl phenyl and benzyl, the steps of contacting under basic reaction conditions at temperatures ranging from about 0 to about 100° C. an olefin oxide and an oxime and recovering the resulting beta-hydroxyalkyl ether of oxime.

8. In the process of claim 7, the step of contacting the olefin oxide and oxime under basic reaction conditions at a temperature within the range 50° C.–80° C.

9. In a process for the production of beta-hydroxyalkyl ethers of oximes having the structural formula:

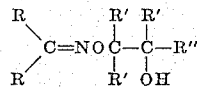

wherein R′ is hydrogen, R″ is selected from the group consisting of hydrogen, lower alkyl and phenyl, and R is selected from the group consisting of hydrogen, alkyl and aryl; the steps of contacting at temperatures ranging from 0–100° C. an olefin oxide with an oxime in the presence of a basic material which does not react with the olefin oxide and which in aqueous solution gives a pH greater than approximately 7.0, and recovering the beta-hydroxyalkyl ethers of oximes thereby formed.

10. In the process of producing 2-hydroxyethyl ether of acetoxime, the steps of contacting ethylene oxide and acetoxime at temperatures ranging from 0–100° C., in the presence of sodium hydroxide, and recovering the resulting 2-hydroxyethyl ether of acetoxime.

11. In the process of producing 2-hydroxyethyl ether of acetophenone oxime, the steps of contacting at temperatures ranging from 0–100° C. ethylene oxide and acetophenone oxime in the presence of lithium ethoxide and recovering the resulting 2-hydroxyethyl ether of acetophenone oxime.

12. In the process for the production of 2-hydroxy-1-propyl ether of butanone oxime, the steps of contacting at temperatures ranging from 0–100° C. propylene oxide and butanone oxime in the presence of sodium ethoxide and recovering the 2-hydroxy-1-propyl ether of butanone oxime thereby formed.

References Cited in the file of this patent

UNITED STATES PATENTS 2,223,181    Miller et al.    Nov. 26, 1940
2,880,238    Kundiger et al.    Mar. 31, 1959

OTHER REFERENCES

Cretcher et al.: Jour. Amer. Chem. Soc., vol. 46 (1924), pages 1503–04 (2 pages), Patent Office Library.